United States Patent [19]

Toro et al.

[11] Patent Number: 4,914,547

[45] Date of Patent: Apr. 3, 1990

[54] PROCESS FOR MAKING CAPACITORS

[75] Inventors: Joseph A. Toro; Thomas G. Johnson; Fred W. Olmsted, all of Ogallala, Nebr.

[73] Assignee: American Shizuki Corporation, Canoga Park, Calif.

[21] Appl. No.: 190,966

[22] Filed: May 6, 1988

[51] Int. Cl.[4] .................... H01G 1/14; H01G 7/00; H05K 1/04
[52] U.S. Cl. .................... 361/323; 29/25.42; 361/306
[58] Field of Search .................. 361/302, 306, 433 W, 361/307, 540, 525, 526; 29/25.42; 219/354

[56] References Cited

U.S. PATENT DOCUMENTS

| | | | |
|---|---|---|---|
| 2,057,314 | 10/1936 | Robinson | 361/526 |
| 2,995,688 | 8/1961 | Rosenberg | 361/323 |
| 3,086,149 | 4/1963 | Baron | 361/306 X |
| 3,156,854 | 11/1964 | Beyer | 361/307 X |
| 3,436,610 | 4/1969 | Sparrow et al. | 361/433 W |
| 3,585,468 | 6/1971 | Chertok et al. | 361/323 |
| 3,612,957 | 10/1971 | Steigerwald | 361/540 |
| 3,806,766 | 4/1974 | Fanning | 361/540 X |
| 4,034,180 | 7/1977 | Kobayashi et al. | 219/354 X |
| 4,039,905 | 8/1977 | Pearce | 361/525 |
| 4,205,365 | 5/1980 | Kalina | 361/433 T X |
| 4,363,162 | 12/1982 | Price | 361/323 X |
| 4,654,751 | 3/1987 | Tokura et al. | 361/323 X |

FOREIGN PATENT DOCUMENTS 2233809 1/1974 Fed. Rep. of Germany ...... 361/306

Primary Examiner—Donald A. Griffin
Attorney, Agent, or Firm—Nilsson, Robbins, Dalgarn, Berliner, Carson & Wurst

[57] ABSTRACT

An epoxy-encased wound capacitor suitable for being surface mounted and wave soldered to electronic circuitry, e.g. circuit boards and process for making the epoxy-encased wound capacitor. The wound capacitor is formed from winding together lengths of two bilaminar ribbons. The capacitor is then cured by exposing it to ultrasonic energy according to a predefined ultrasonic profile while at substantially the same time, mechanically pressing the capacitor. Contacts are formed on the capacitor and wire leads attached. Subsequently, the capacitor is placed in a flexible, reusable plastic mold featuring lead guides for precisely spacing the leads of the capacitor. Bubble-free epoxy is poured in the molds and heat cured. The epoxy-encased capacitor, suitable for surface mounting and wave soldering, is then removed from the mold.

12 Claims, 2 Drawing Sheets

4,914,547

PROCESS FOR MAKING CAPACITORS

FIELD OF THE INVENTION

The present invention relates generally to the field of capacitors and more specifically to the field of manufacture and design of wound capacitor devices.

BACKGROUND OF THE INVENTION

Capacitors of various types are well known and useful in a wide variety of electronics applications. There are a wide variety of types of capacitors, each having a particular arrangement of conductors and dielectrics used to secure capacitance for the storage of electrical energy in an electric field. An essential feature of all capacitors is a system of conductors separated by dielectrics.

In this regard, one particular type of capacitor is termed a 'wound capacitor'. Wound capacitors comprise a pair of wound bilaminar ribbons each of which has a layer of dielectric substance, e.g. polyester or polystyrene, upon which a conductive layer, e.g. metal, is deposited. The pair of ribbons are partially overlapped and wound together so that one edge of each ribbon forms a contact for the capacitor. When completely wound, the capacitor takes on the general shape of a cylinder with either end functioning as a contact.

Generally, wound capacitors are superior to other types of capacitors, e.g. ceramic capacitors, because of their improved performance and self-curing characteristics. For example, wound capacitors may be self-curing, that is a short or defect affecting the performance of a part of the capacitor may not significantly affect the performance or operation of the capacitor as a whole. In spite of the performance advantages of wound capacitors over some other capacitors, e.g. ceramic capacitors, wound capacitors have been limited in their application in some areas because of the difficulty or inability to incorporate them in various circuitry due to connection problems. Accordingly, conventional manufacture and design of wound capacitors have not fully addressed these problems.

In addition to these problems, various defects affect the efficiency and, therefore, the performance of a wound capacitor. For example, moisture trapped between the layers of the capacitor may cause shorting in the capacitor. Likewise, air gaps between its layers may cause ionization in the capacitor reducing the performance of the capacitor. These defects are inherent in the winding process. Generally, the ribbons of the capacitors cannot be wound tight enough by conventional winding means to eliminate these defects without damaging the ribbons or causing other defects. Accordingly, in conventional capacitor manufacturing the capacitors must be processed by heat curing them in a time-consuming manner to remove substantially all of the defects that inherently result from the winding process.

In conventional wound capacitor manufacturing, defects that inherently result from winding the capacitors, e.g. moisture and air, are removed from the capacitor by mechanically compressing the capacitor for a period of time, approximately one hour, and then heat-curing the capacitor at a high temperature, approximately 145° C., for approximately twelve hours or other appropriate extended period of time. Accordingly because of factors, such as the significant time factor involved in the conventional curing process, the cost of manufacture of wound capacitors can be relatively high.

Another factor in wound capacitor manufacturing and design is the method by which the wound capacitor can be connected to electronic circuitry, e.g. circuit boards. It is economical an time efficient to be able to surface mount electric components and utilize various soldering techniques, e.g. wave soldering to connect them. However, wound capacitors are often not designed for surface mounting nor are they necessarily compatible with some soldering techniques, e.g. wave soldering. For example, a wound capacitor of conventional design may not be surface mounted using wave soldering methods because the wave soldering method may cause damage to the wound capacitor unless it is protected. Further, the surface mounting and some soldering methods, e.g. wave soldering, often require relatively precise lead spacing, a feature often not available with conventional wound capacitors. As a result of these problems, many users turn to ceramic capacitors in spite of the inferior performance they offer. Some conventional methods of wound capacitor manufacturing and design have attempted to address these problems.

In this regard, some conventional capacitor manufacturing and design have enabled wound capacitors to be wave soldered to the electronic circuitry. In these methods and designs, usually the ends of the capacitor are metallized by schooping, a process in which the end surfaces of the capacitor are coated with metal by spraying them with the molten metal shot from a nozzle with compressed air. Wire leads are the metallized conductive ends of the capacitor. Thereafter, the capacitor is placed in a protective preformed case, and the case is filled with epoxy to seal the capacitor in the case. The need for a preformed case in conventional manufacturing methods contributes significantly to the cost of the process. Further, utilization of these methods and capacitor designs may result in various defects in the capacitor, e.g. in misaligned wire contacts, bubbles in the epoxy filling, non-adherence of the epoxy to the casing, which may result in diminished performance, unusable or nonfunctional capacitors.

Accordingly, there exists a need for a more rapid and economical process for making wound capacitors. In this regard, the present invention provides a more rapid and economical process for making wound capacitors as well as a design for a wound capacitor that enables the capacitor to be surface mounted on electronic circuitry and soldered by various methods, including wave soldering.

SUMMARY OF THE INVENTION

In the present invention, two bilaminar ribbons are wound together to form a wound capacitor. Each ribbon comprises a dielectric film, e.g. polyester, having a conductive layer, e.g. aluminum, deposited, such as by conventional vapor deposition techniques to form a conductive "foil" layer, on one surface of the dielectric film but leaving a margin area along one edge substantially uncovered by the metallic foil. The substantially non-conductive dielectric side of one ribbon is laid over the substantially conductive side, i.e. "foil" side, of the other ribbon so that the metallized edge of each ribbon overlaps the substantially nonmetallized edge of the other ribbon.

Once the ribbons are properly aligned, they are wound together along their lengths into a tight coil to form a cylinder of the required size corresponding to the desired capacitance. Once the capacitor is wound, it is ultrasonically cured according to a predefined ultrasonic profile for a short period of time, usually less than one second. The ultrasonic curing causes heating in the capacitor thereby shrinking the material forming the dielectric layers of the capacitor. Accordingly, defects from the winding process, e.g. moisture and air, are substantially eliminated from the capacitor. Mechanical compressing of the capacitor may be utilized in conjunction with the ultrasonic cure to effect a substantially defect-free capacitor, i.e. substantially free of moisture and air. Optionally, the capacitor can be additionally heat cured for one hour to further assure substantially all defects from the winding process are removed from the capacitor.

After curing, the ends of the capacitors are metallized through sputter deposition, the wire leads are attached, and, in one embodiment, a pair of capacitors is placed in a reusable mold. The mold is made of a plastic substance that is substantially nonreactive with epoxy, e.g. polypropylene. The wire leads are aligned in specifically placed lead guides on the mold and epoxy is added to the mold to cover the capacitors. The epoxy is added to the mold directly from a vacuum container where it is kept under vacuum. The vacuum prevents air bubbles from forming in the epoxy that is poured in the mold. This prevents air pockets from being formed in the poured epoxy casing which might otherwise affect the performance and/or appearance of the product.

Once poured, the mold is then heat cured in an oven to cure the epoxy thus hardening it. Once the epoxy cures, the epoxy encased components, e.g. encased wound capacitors, is removed from the mold, and its wires trimmed and formed to fit the product's use.

Accordingly, the present invention provides a more economical and less time-consuming method for making wind capacitors than conventional methods currently used.

DETAILED DESCRIPTION OF THE INVENTION

Figure 1:
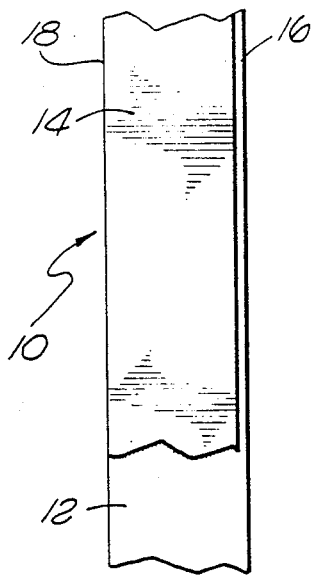
FIG. 1 is a plan view of a ribbon component of a wound capacitor in accordance with the present invention.

Referring to FIG. 1 a bilaminar ribbon 10 used in a wind capacitor in accordance with the present invention is shown. The ribbon 10 has a film of dielectric material 12, e.g. polyester, which serves as a base upon which a conductive layer 14, e.g. aluminum, is deposited using conventional deposition methods, e.g. vapor deposition. The conductive layer 14 is deposited having a margin 16 of substantially uncovered dielectric film along the length of the ribbon 10. The conductive layer 14 substantially covers the remainder of the dielectric film 12 and is substantially coterminal with the edge 18 of the ribbon 10. Accordingly, the bilaminar structure of the ribbon 10 establishes the layers of conductive and dielectric structures that form the basic elements of a capacitor. In this regard, the conductive layer 14 serves as the conductive structure in the capacitor and the dielectric material 12 serves as the dielectric structure in the capacitor.

Figure 2:
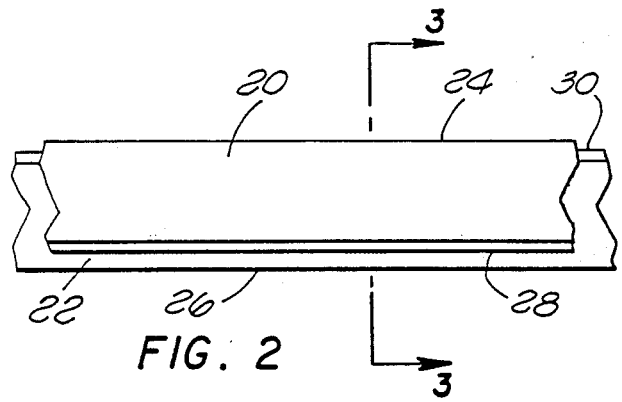
FIG. 2 is a plan view showing the alignment of ribbons to form a wound capacitor in accordance with the present invention.

Referring to FIG. 2, the pairing and orientation of ribbon layers in a wound capacitor in accordance with the present invention are shown. In one embodiment, a first ribbon 20 is overlayed on a second ribbon 22 so that the conductive edge 24 of the first ribbon 20 extends to or just beyond the nonconductive margin 30 of the other ribbon. Similarly, the conductive edge 26 of the second ribbon 22 extends to or just beyond the nonconductive margin 28 of the first ribbon 20. This layered structure enables the conductive edge 24 of ribbon 20 to serve as one pole of the capacitor and the conductive edge 26 of ribbon 22 to serve as the pole for the other end of the capacitor.

Figure 3:
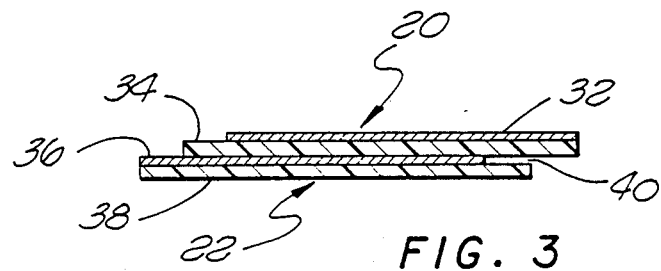
FIG. 3 is a cross-section taken along the line 3—3 of FIG. 2.

Referring to FIG. 3, a cross-section of the overlayed ribbons shown in FIG. 2 illustrates the manner in which the layers of the ribbons structurally form a capacitor. The first ribbon 20 overlays the second ribbon 22 so that its dielectric layer 34 is adjacent with the conductive layer 36 of the second ribbon 22. When the paired overlayed ribbons 20 and 22 are wound together along their lengths, the conductive layer 32 of the first ribbon will become adjacent with the dielectric layer 38 of the second ribbon 22. Accordingly, the alternating layers of conductive material, i.e. the conductive layers 32 and 36, and the dielectric materials, i.e. dielectric layers 34 and 38, form the basic structure of a capacitor. In overlaying or winding of the ribbons 20 and 22, moisture and/or air gaps 40 are frequently formed between the layers and are undesirable and almost inevitable results of the winding process. These defects in the structure of the capacitor formed by moisture or air gaps 40 can adversely affect the capacitor's performance. Accordingly, the capacitor must be processed further to substantially eliminate these impurities or defects.

Figure 4:
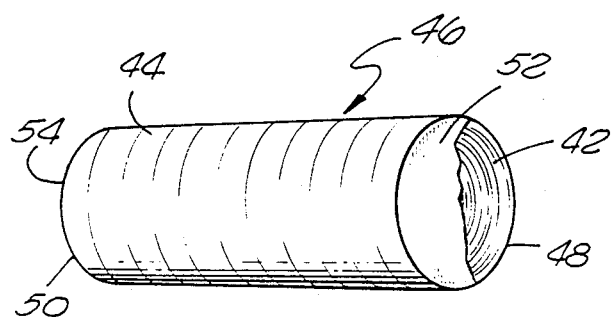
FIG. 4 is a perspective, part cut-away view of a wound capacitor in accordance with the present invention.

Turning to FIG. 4, a wound capacitor is shown in accordance with the present invention. When the overlayed ribbons 20 and 22 (FIG. 3) are wound together along their lengths, a wind 46 is formed. Depending on the capacitance needed, wind may be made as large or as small as needed until the desired capacitance is achieved. Once the wind 46 of desired capacitance has been formed, the wind is wrapped with a dielectric material 44, thereby encasing the wind 46. The wrap 44 may be made of the same dielectric material, e.g. polyester, that forms the dielectric film 12 comprising part of a ribbon 10 (FIG. 1). The wrapped winding forms a capacitor 30. The capacitor 30 must then be processed, e.g. cured, to remove impurities, e.g. moisture and/or air, that might otherwise affect its performance.

In one working embodiment, the capacitor 30 is simultaneously exposed to ultrasonic energy, according to a predefined ultrasonic profile, for a short period of time, approximately 0.6 seconds and mechanically pressed radially inward at approximately 25 psi. A slightly modified Branson Model 4MB3 40XL 350 watt power supply may be used to produce the ultrasonic energy used to cure the capacitor 30 and allow the mechanical pressure to be applied to the capacitor at the same time. Curing the capacitor 30 according to a predefined ultrasonic profile stabilizes the dielectric film of the capacitor 30. Accordingly, impurities, e.g. moisture and air, are substantially eliminated from the structure of the capacitor.

Various ultrasonic profiles may be used to cure the capacitor 30 depending on a variety of factors, including capacitor size, materials, capacitance, and need to name a few. Accordingly, many profile options are available, e.g. a flat profile, i.e. exposure to substantially one ultrasonic energy, a stepped-up profile, i.e. exposure to increased levels of ultrasonic levels, a stepped-down profile, i.e. exposure to decreasing levels of ultrasonic energy, or a burst sequence, i.e. exposure to sequential bursts of ultrasonic energy. Certainly various exposure times and total cure times are also possible. Thus, a large number of options utilizing ultrasonic curing are available.

Depending on the size of the capacitor and the capacitance, ultrasonic energy of greater or less than 350 watts of power may be used. Similarly, the capacitor 30 may be exposed to the ultrasonic energy for a greater or lesser period of time than 0.6 seconds. However, if the capacitor is exposed to ultrasonic energy of too high a power or for too long a period of time, the insulation resistance of the capacitor may break down. Accordingly, the performance of the capacitor may be reduced. Similarly, if the capacitor is exposed to too little ultrasonic energy or for too short a period of time, it may not be cured, and the remaining impurities in the capacitor 30 may inhibit its performance.

It is hypothesized that the effect of exposing the capacitor 30 to ultrasonic energy is to heat the capacitor 30 from the inside out. This is distinguishable from conventional heat curing which heats from the outside to the inside of the capacitor. The exact reason the capacitor cures by ultrasonic energy is uncertain, however, it is hypothesized that the ultrasonic energy causes physical movement of the materials forming the capacitor thereby heating it and causing shrinkage of the dielectric layers. At substantially the same time as the capacitor 30 is exposed to the ultrasonic cure, it may be mechanically compressed to assist in eliminating various defects, curing or to press the capacitor 30 in a different shape. In any event, the mechanical compression used should not be so great as to damage the capacitor not so small as to ineffectively function to assist in removing defects or to form the capacitor 30. In one working embodiment, approximately 25 psi has been utilized with good results.

Optionally, the capacitor may be baked at elevated temperatures to cause the dielectric film to shrink hereby driving out any impurities that might remain after the capacitor 30 is ultrasonically cured. In general, the dielectric film, e.g. polyester, used in a wound capacitor shrinks at temperatures above 130° C. In a working embodiment, baking the ultrasonically cured capacitor for approximately one hour at a temperature of approximately 150° C. has been found to effectively remove substantially all impurities from the capacitor. However, depending on the dielectric material used and the effectiveness of the ultrasonic cure utilized, there is a corresponding wide variation in the baking required to remove impurities beyond that which is removed by the ultrasonic cure process. Regardless, whether the ultrasonic cure process is used alone or in conjunction with a heat cure, the process of the present invention represents a substantial reduction in the time and economy of wind capacitor manufacture over conventional methods and processes. It should be noted, that the capacitor may be mechanically pressed into various shapes prior to or at substantially the same time as the ultrasonic curing. Accordingly, the winding of the capacitor may be mechanically pressed from a round shape into another shape to fit a particular need.

Referring again to FIG. 4, after the capacitor 30 has been cured, the ends 48 and 50 may be metallized by deposition of metal onto those surfaces. Accordingly, conductive contact surfaces 52 (shown partially cutaway) and 54 (not shown) are formed at the ends of the capacitor 30. A conventional method for metallizing capacitor surfaces shown in FIG. 4 is by schooping. Schooping is a process in which the surface is coated with a metal by spraying the surface with the molten metal shot from nozzle with compressed air. In a working embodiment of the present invention, sputter deposition, i.e utilizing a plasma directed at a sputter target to deposit target material onto a desired surface, is utilized in the present invention to metallize the ends of the capacitor 30 to form the metallized contact surfaces 52 and 54.

Figure 5:
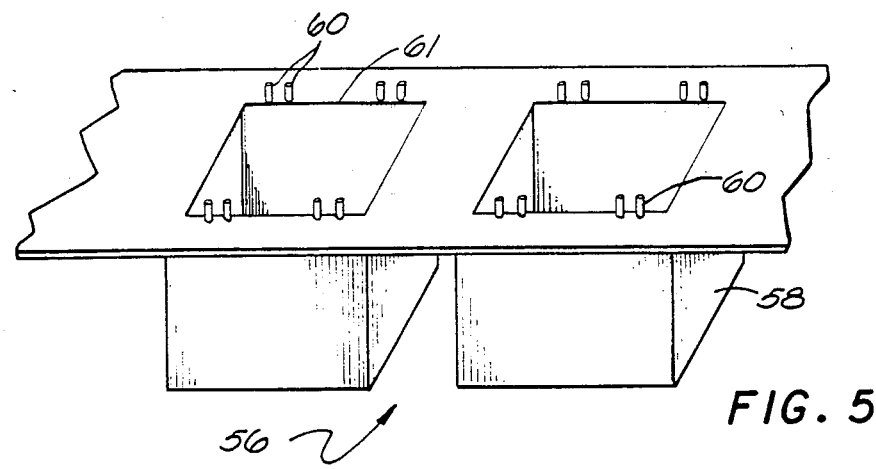
FIG. 5 is a perspective plan view of a potting mold for use in encasing electrical components in accordance with the present invention.

Referring to FIG. 5, a potting mold 56 used in encasing the capacitors in protective epoxy is shown. The potting mold 56 has a plurality of mold forms 58 that are formed to mold the epoxy into the desired shape.

The epoxy used to fill the mold forms 58 is kept under vacuum in a vacuum container or chamber preventing undesirable air bubbles from forming in the epoxy. Simply pouring the epoxy into the mold, without first removing air bubbles would result in the bubbles being incorporated into the epoxy casing that will encase the electronic components, e.g. a capacitor.

In this regard, the air bubbles trapped in the epoxy may adversely affect the performance of the electronics, e.g. the capacitors, or the casing itself due to structural weaknesses caused by the bubbles in the epoxy casing. Similarly, the epoxy casing may be cosmetically unacceptable, having a pitted surface or exposed components, e.g. capacitors. Thus, using the bubble-free epoxy to pour the molds contributes to the cosmetic and function of the epoxy casing and the final product comprising the epoxy-encased electronic components.

Referring again to FIG. 5, the particular design of the mold form 58 illustrated in FIG. 5 is for a dual capacitor design. As shown, the mold form 58 is generally cubic in shape, but many designs and sizes are possible depending upon need. The potting mold 56 comprises a reusable plastic material substantially non-epoxy reactive. Thus, when epoxy is poured into the mold, the epoxy will be substantially nonreactive with the material comprising the potting mold. Further, the potting mold material should be substantially non-epoxy adherent, i.e. when the epoxy is cured in the mold, the molded epoxy material should be relatively easy to remove from the mold form 58 without creating unnecessary damage to the mold. In one working embodiment, the material comprising the potting mold 58 is polypropylene. However, other materials may be used with similar success.

An advantage to utilizing reusable polypropylene for the potting molds 56 are that the molds are flexible, allowing for relatively easy removal of the molded epoxy forms with little or no damage to the mold itself, and reusable, thereby reducing the cost of the molds themselves. Accordingly, no preformed epoxy case is needed since the entire casing is formed in the mold itself, and because the potting mold 56 can be used without the need of a preformed case, there is a significant savings in tooling and the absence of a case that would cost additional money. Further, polypropylene molds are flexible with regard to other designs, that is, the polypropylene can be made in a wide variety of mold shapes and ease and cost of designing a mold in polypropylene to sizes or shapes is relatively low.

As shown in FIG. 5, pairs of lead guides 60 are provided at the upper edge or rim 61 of each mold form to enable precision spacing of the wire leads of the electric components that will be embedded within the epoxy case. This feature contributes to enabling surface mounting of the encased components and significantly increases the precision with which the leads may be spaced. The dual capacitor design of the potting mold 56 shown in FIG. 5 has four lead guides, two for each capacitor. Because the lead guides enable precision in lead spacing, direct board soldering of the completed component comprising the electrical components embedded in the epoxy block is made easier.

Figure 6:
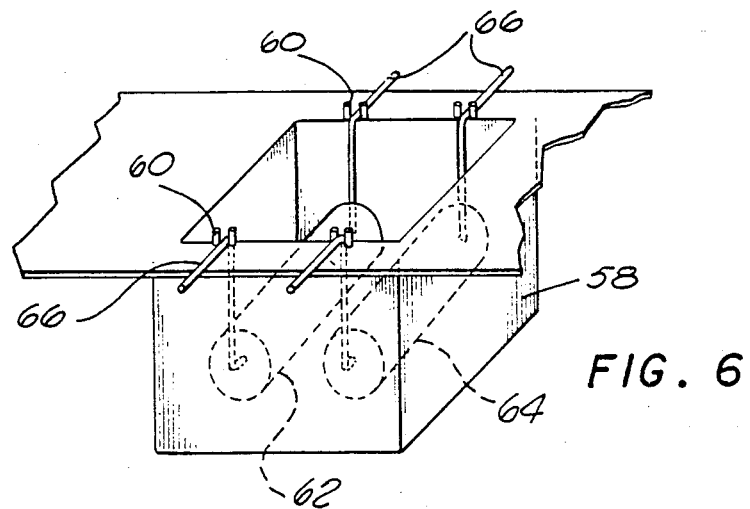
FIG. 6 is a perspective plan view, partly ghosted, showing the placement of electrical components and wiring in a potting mold form.

Referring to FIG. 6, a pair of capacitors 62 and 64 are shown placed in mold form 58. The wire leads 66 connected to the contacts of the capacitors 62 and 64 are aligned in the lead guides 60 to accurately position the lead. Subsequently, epoxy is added to the mold to cover the capacitors. As stated earlier, the epoxy is kept in a vacuum container to remove air bubbles from the epoxy fluid. The epoxy is added directly from the vacuum container to prevent any unnecessary contamination of the epoxy fluid prior to pouring of the mold. It should be noted that the mold forms 58 are not over-filled, but instead are sufficiently filled to cover and protect the electric components. In some cases, as for surface mounting, it is preferable to fill the mold form 58 so that the surface of the epoxy in the mold form 58 is concave but covers the components.

Once the molds have been poured, the potting mold 56 is placed in an oven at approximately 50° C. to 55° C. for approximately thirty minutes. After the epoxy has been cured, the cured epoxy casings are removed from the mold. Preferably this is done while the mold is still hot thereby reducing the chance of damage to the potting mold 56 or to the cured epoxy casing.

Figure 7:
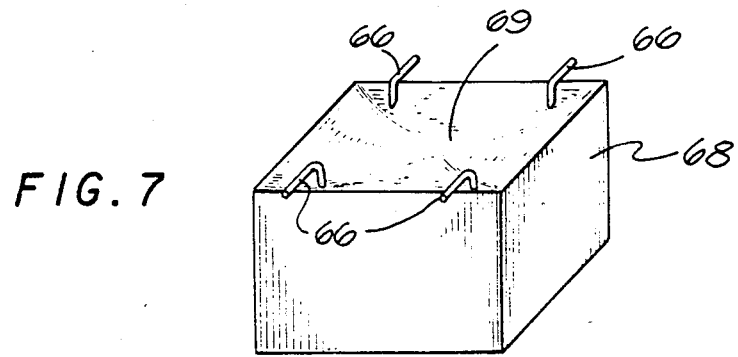
FIG. 7 is a perspective plan view of the finished electrical component encased in epoxy in accordance with the present invention.

Referring to FIG. 7, a finished epoxy casing 68 is shown wit its concave contact surface 69 and wire leads 66 trimmed for surface mounting and/or wave soldering. In this form, the electric components, e.g. the wound capacitors 62 and 64 can be surface mounted and/or wave soldered to a circuit board or to other electronic circuitry, or connected to electronic circuitry by other soldering and connecting means.

What is claimed is:

1. A process for making a wound capacitor comprising:

winding together two lengths of ribbon to form a winding with two ends, the ribbons being curable in response to application of ultrasonic sound energy;

applying ultrasonic sound energy to the winding for curing said winding;

metallizing the ends of said cured winding to form electrical contacts on each end thereof; and attaching wire leads to said contacts.

2. The process for making a wound capacitor as described in claim 1 further comprising:

placing the cured winding with wire leads attached thereto in a mold form made of a material substantially non-reactive with epoxy;

filling the mold form with epoxy;

curing the epoxy by heating the mold form and epoxy contained therein; and removing said cured epoxy containing said capacitor from the mold form whereby the mold form is reusable.

3. The process for making a wound capacitor as described in claim 2 wherein the ultrasonic energy is applied according to a predefined energy magnitude and time time duration profile.

4. The method of claim 2 further comprising the step of mounting the epoxy in a vacuum container immediately prior to the step of filling.

5. The method of claim 2 wherein the step of filling comprises filling the cavity with bubble-free epoxy.

6. The process for making a wound capacitor as described in claim 1 wherein the ultrasonic energy is applied according to a predefined energy magnitude and time duration profile.

7. The process for making a wound capacitor as described in claim 1 wherein each of said ribbons includes a conductive ply and a dielectric ply.

8. The process for making a wound capacitor as described in claim 1 wherein each of said ribbons comprise a dielectric ply having an electrically conductive coating disposed on one surface thereof.

9. An ultrasonic energy curable capacitor suitable for surface mounting comprising:

a pair of ultrasonic energy curable ribbons, each ribbon defining a conductive ply and a dielectric ply wound together for forming a winding;

a first contact disposed at one end of said winding for electrical connection to one ribbon and a second contact disposed at the other end of said winding for electrical connection to the other ribbon;

a wire lead attached to each of said contacts; and an epoxy housing encasing said winding wire leads extending from the epoxy housing for enabling electrical interconnection to the winding.

10. A mold for forming a protective epoxy housing to encase at least one electronic component in the protective epoxy housing, the electronic component having at least one lead coupled thereto for extending from the epoxy housing, the mold comprising:

a mold form having at least one cavity therein, each cavity having a rim thereabout, downwardly extending walls and a bottom corresponding to the desired shape of the epoxy housing to be molded; and a plurality of post pairs projecting from said rim positioned about the rim, the posts of each pair spaced for receiving and positioning one of the leads from said electronic components therebetween for receiving and holding the leads as epoxy is placed in the cavity surrounding the electronic component.

11. The mold of claim 10 wherein the mold is made of polypropylene.

12. The mold of claim 10 wherein the mold is made of material releasable from epoxy.

* * * * *

UNITED STATES PATENT AND TRADEMARK OFFICE
CERTIFICATE OF CORRECTION

PATENT NO. : 4,914,547
DATED : APRIL 3, 1990
INVENTOR(S) : JOSEPH A. TORO; THOMAS G. JOHNSON; FRED W. OLMSTED

It is certified that error appears in the above-identified patent and that said Letters Patent is hereby corrected as shown below:

Col. 1, line 19, delete 'wound capacitor' and substitute therefor --"wound capacitor--.

Col. 2, line 6, delete "an" and substitute therefor --and--.

Col. 5, line 59, delete "hereby" and substitute therefor --thereby--.

Col. 6, line 7, delete "wind" and substitute therefor --wound--.

Col. 6, line 23, after "from" insert --a--.

Col. 6, line 26, after "i.e" insert --.--.

Col. 7, line 53, delete "wit" and substitute therefor --with--.

Signed and Sealed this

Sixth Day of August, 1991

*Attest:*

HARRY F. MANBECK, JR.

*Attesting Officer*       *Commissioner of Patents and Trademarks*